US007546151B2

(12) United States Patent
Hartley

(10) Patent No.: US 7,546,151 B2
(45) Date of Patent: *Jun. 9, 2009

(54) EXPANDABLE, MODULAR COMMUNICATIONS APPARATUS WITH WIRELESS INTERCHANGEABLE DEVICE AUTHENTICATION

(75) Inventor: Joel S. Hartley, Solana Beach, CA (US)

(73) Assignee: Procon, Inc., Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/110,251

(22) Filed: Apr. 25, 2008

(65) Prior Publication Data

US 2008/0198018 A1 Aug. 21, 2008

Related U.S. Application Data

(63) Continuation-in-part of application No. 10/971,377, filed on Oct. 22, 2004, now Pat. No. 7,366,551.

(60) Provisional application No. 60/512,928, filed on Oct. 22, 2003, provisional application No. 60/512,929, filed on Oct. 22, 2003, provisional application No. 60/512,930, filed on Oct. 22, 2003.

(51) Int. Cl.
*H04M 1/00* (2006.01)

(52) U.S. Cl. .............. 455/575.1; 455/575.2; 455/418; 455/420; 455/411

(58) Field of Classification Search .............. 455/575.1, 455/575.2, 418, 411, 420
See application file for complete search history.

(56) References Cited

U.S. PATENT DOCUMENTS

| 6,212,445 | B1* | 4/2001 | Barba et al. ................. 700/280 |
| 6,542,750 | B2* | 4/2003 | Hendrey et al. ........... 455/456.1 |
| 2004/0180657 | A1* | 9/2004 | Yaqub et al. ............. 455/435.1 |
| 2004/0215950 | A1* | 10/2004 | Lindeman ...................... 713/1 |
| 2005/0254630 | A1* | 11/2005 | Tokoro ........................ 379/52 |
| 2006/0117015 | A1* | 6/2006 | Bisbee et al. ................. 707/9 |

* cited by examiner

*Primary Examiner*—Alexander Eisen
*Assistant Examiner*—Eric Elcenko
(74) *Attorney, Agent, or Firm*—Mintz, Levin, Cohn, Ferris, Glovsky and Popeo, P.C.

(57) ABSTRACT

Communications systems and methods can include wide area network communication capabilities provided by a communications module or device and additional functionality provided by one or more interchangeable devices that interface with the communications module. One or more of the interchangeable devices can communicate with the communications module or device via a short range wireless signal, such as for example that of an RFID, WiFi, or Zigbee system. Authentication of the communication device in combination with the one or more interchangeable devices can be included to provide device compatibility and security verification.

20 Claims, 7 Drawing Sheets

EXPANDABLE, MODULAR COMMUNICATIONS APPARATUS WITH WIRELESS INTERCHANGEABLE DEVICE AUTHENTICATION

CROSS-REFERENCE TO RELATED APPLICATIONS

This application claims the benefit of U.S. provisional patent application Nos. 60/512,928, filed on Oct. 22, 2003 and entitled "Method And Apparatus to Add Multiple Communications Bearers to a Mobile Communications Device;" 60/512,929, filed on Oct. 22, 2003 and entitled "Method and Apparatus to Authenticate Two or More Connectable Parts in a Mobile Communications Device and to Activate Services;" and 60/512,930 filed on Oct. 22, 2003 and entitled "Method and Apparatus for a Two Part Mobile Communications Device Comprised of an Outer Part Called the Shell and an Inner Part Called the Module" the disclosures of which are incorporated by reference herein in their entireties.

This application is a continuation-in-part of application for U.S. patent Ser. No. 10/971,377, filed on Oct. 22, 2004 now U.S. Pat. No. 7,366,551and entitled "Expandable, Modular Communications Apparatus with Interchangeable Device Authentication" which is incorporated by reference herein in its entirety.

FIELD

The subject matter described herein relates generally to communications devices and, more particularly, to device-to-device communication where the communications apparatus interchangeably connects to other devices.

BACKGROUND

Communications systems are typically created by integrating various components of the system into a single embedded device. A monolithic communications system is often the lowest cost, compact and rugged solution for high-volume products such as cellular telephone handsets, but it requires a substantial. amount of development effort for each product variant. This development effort is not feasible in many device to device applications because of lower production volumes and the high degree of customization needed for each application. Thus, a need exists to provide a modular and customizable solution to device to device applications.

Another difficulty with modem communications systems is ensuring that all parts of the mobile system are authentic, that the mobile's features are allowed by the network and that all parts of the system are compatible. This is necessary to prevent fraud and to ensure correct behavior of the system. This problem is not evident in monolithic communications systems because such systems are integrated during the design process and authenticated when they are activated on a network. If the parts of the device or their connections are changed then adjustments must be made to the configuration. In computers this problem is managed by sophisticated user interfaces and elaborate setup procedures. However, in device to device communications systems, there are limited or no user interfaces to control the system configuration, so this process must be controlled remotely.

SUMMARY

The subject matter described herein provides many advantages, that in some implementations can include but are not limited to an ability to interchangeably connect chosen devices to a communications system and to activate and/or authenticate specific communications system/device combinations to ensure system device compatibility and security.

In one aspect, a system includes a standardized electronic interface, a wireless interchangeable device that is physically interfaced to the standardized interface, and a communications system that is physically interfaced to the standardized electronic interface. The wireless interchangeable device includes a short range wireless transceiver and a first electronic serial number memory. The short range wireless transceiver provides a wireless communication link via which the first electronic serial number memory receives a tag device electronic serial number from a tag device. The communications system includes a communication system memory bearing a second electronic serial number, a wireless wide area network terminal, and a control processor executing an authentication agent. The authentication agent transmits, via the wireless wide area network terminal, a report that includes the tag electronic serial number and the second electronic serial number to an authentication administrator and receives, also via the wireless wide area network terminal, an authorization command that directs the authentication agent to either enable one or more authorized functions of the system if the tag and the second electronic serial numbers are verified by the authentication administrator or to disable the one or more functions of the system if the tag and the second electronic serial numbers are not verified by the authentication administrator.

In a second interrelated aspect, a method includes receiving, at an authentication administrator via a wireless wide area network connection, a report from an authentication agent on a communication system. The report includes a first electronic serial number corresponding to the communication system and a second electronic serial number corresponding to a tag device that communicates wirelessly with a wireless interchangeable device that is physically interfaced to the communication system. The first and the second electronic serial numbers are compared with a database of electronic serial numbers. An authorization command is transmitted to the communication system via the wireless wide area network. The authorization command directs the authorization agent to a) enable one or more functions of the communication system if the first and the second electronic serial numbers are verified by the authentication administrator or b) disable one or more functions of the communication system if the first and the second electronic serial numbers are not located in the database.

In a third interrelated aspect, a method includes transmitting a report from an authentication agent executed on a communication system to an authentication administrator via a wireless wide area network terminal on the communication system. The report includes a first electronic serial number read by the authentication agent from a first memory on the communication system and a second electronic serial number that is received at a wireless interchangeable device via a wireless link from a tag device, the wireless interchangeable device being physically interfaced to the communication system via a standardized interface on the communication system. An authorization command is received via the wireless wide area network terminal. The authorization command directs the authorization agent to a) enable one or more functions of the communication system if the first and the second electronic serial numbers are verified by the authentication administrator or b) disable one or more functions of the communication system if the first and the second electronic serial numbers are not verified by the authentication server.

Various aspects can also include one or more of the following optional features. The system can also optionally include one or more tag devices that each includes a tag memory bearing the tag electronic serial number and a transceiver that transmits the authentication signal. Upon receiving the tag electronic serial number, the authentication agent can optionally read the second electronic serial number from the communication system memory and transmit the report if either the tag electronic serial number or the second electronic serial numbers differ from their previous values.

An additional interchangeable device that is physically interfaced to the standardized electronic interface can optionally be included. The additional interchangeable device can optionally include a position location device, an additional memory storing a third electronic serial number, and an additional connector adapted to mate with the standardized electronic interface, the report further comprising the third electronic serial number. An additional interchangeable device that includes an additional memory storing a third electronic serial number, a first additional connector adapted to mate with the standardized electronic interface, and a second additional connector to mate with the wireless interchangeable device can be optionally included. The report further can optionally include the third electronic serial number; and the wireless interchangeable device can optionally physically interface to the standardized interface by mating with the second additional connector on the additional interchangeable device while the first additional connector mates with the standardized electronic interface.

Functional hardware for performing at least one chosen function selected from the group consisting of digital photography, car diagnostics, position location, equipment testing, hand-free communications, microcomputer capability, and display. The authentication administrator can optionally include a database of valid electronic serial numbers against which the first and the second electronic serial numbers are verified can be optionally included. The wireless wide area network terminal can optionally be selected from a group consisting of cellular telephones and two-way pagers. The communications system can optionally further include a power supply and/or a position locator. The communication system can optionally include a cellular telephone that comprises a removable battery, and wherein one of the wireless interchangeable device and an additional interchangeable device replaces the removable battery.

The one or more functions of the communication system can be provided by an additional interchangeable device that is physically interfaced to the communication system. The report can further optionally include location data regarding the communication system. The administration administrator can optionally further compare the location data to an allowable geographic area corresponding to the second electronic serial number and generate an alert to a designated recipient if the location data indicate that the communication device is not within the allowable geographic area. The communication system can optionally be installed in a vehicle and the one or more functions of the communication system can optionally include an ignition interlock that is activated if the location data indicate that the communication device is not within the allowable geographic area.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed embodiments. In the drawings.

DETAILED DESCRIPTION

Figure 1:
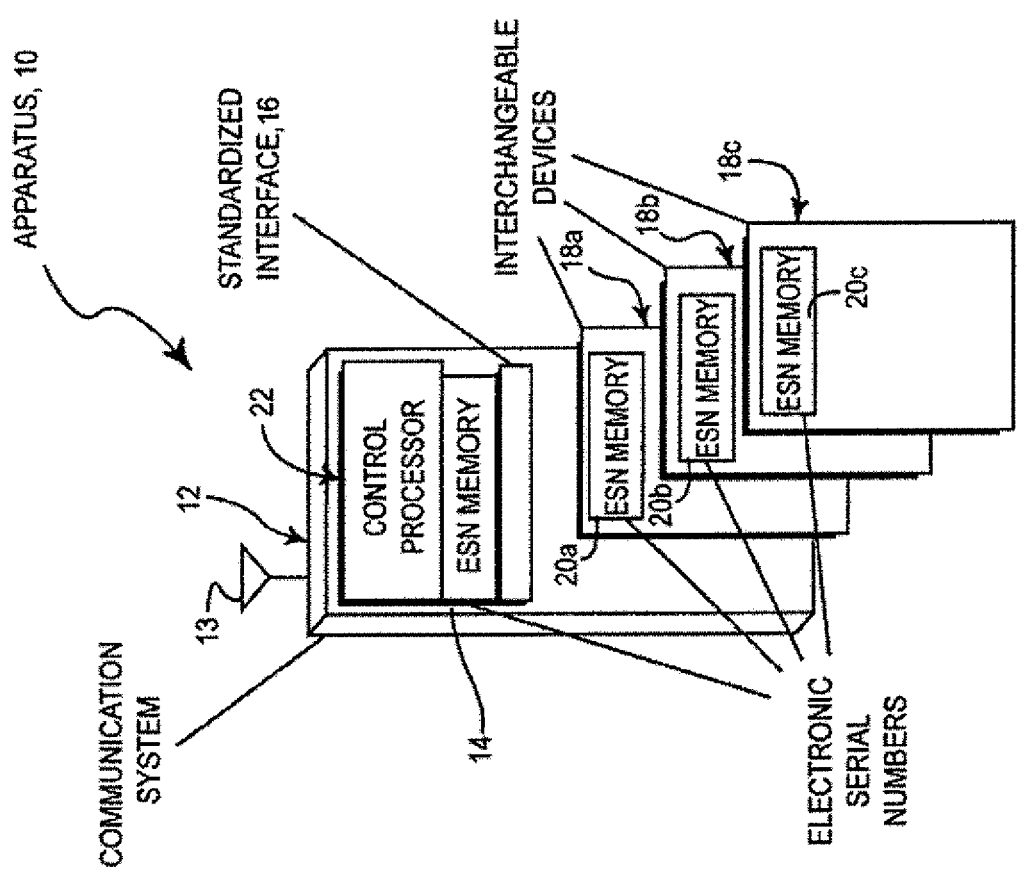
FIG. 1 is a schematic diagram illustrating a communications apparatus that includes an electronic serial number (ESN), a standard interface, device interface cards with their own electronic serial numbers (ESN), and means for authentication.

Briefly, the present invention is a communications apparatus which includes: (a) a communications device such as a wide area network (cellular system), as an example; (b) one or more interchangeable devices; (c) at least one standardized interface adapted for connecting the one or more interchangeable devices to the communications device; and (d) means for authenticating and activating the interchangeable devices. Network applications software may be provided to more completely enable the interchangeable devices to be utilized. A power supply may be provided to provide electrical power to both the communications device and the one or more interchangeable devices. Interchangeable devices presently contemplated by the inventor include: test apparatus, universal serial bus (USB), microcomputer, Bluetooth, WiFi, car diagnostics, keypad and display, hand free communications, GPS position location, and digital cameras, as examples. Additional interchangeable device capabilities can include wireless communication between a tag device and the interchangeable device, such as for example in a radio frequency identification (RFID) system as well as systems and methods using other short range wireless protocols including but not limited to WiFi protocols (such as for example 802.11a, b, g, n, etc.) and Zigbee.

Hardware, software revisions and feature capabilities of communications systems may change throughout the life of the product, and such changes often result in incompatibilities. In accordance with the teachings of the present invention, an authentication administrator stores device compatibility information such that combinations that cannot work together are not allowed, and combinations that are compatible are properly configured, so long as the user has authorization to use the devices.

An example of this concept has been developed by the inventor for use in vehicle location. This device uses a refurbished cellular handset for wide area network (WAN) communications, and its battery has been replaced by a circuit board capable of storing electronic serial numbers (ESNs)

memory chips, a global positioning system (GPS) receiver for positioning and location, a microprocessor for controlling the operation of the device, and a power adapter which connects to the battery of the vehicle in which the apparatus is installed, and a standardized interface connector, among other components.

The interface connector is of the card edge variety so that the interchangeable device circuit board can plug directly -into it, thereby making electrical contact through connections on the edge of the card. A small EEPROM contains the interchangeable devices ESN. One such device has been constructed by the inventor, and includes an RS-232 interface, audio interface microprocessor programming port, GPS antenna port, and system reset. The communications apparatus supports one interchangeable device in the current configuration, but clearly multiple interchangeable devices could be accommodated on the unit using expansion cards. It is intended that authentication hardware and software, as will be described in detail herein below, will be installed to complete the communications apparatus in accordance with the teachings of the present invention.

The housing for the communications apparatus is constructed from a three-part ABS plastic assembly and encloses the above-described cellular telephone, circuit board and interchangeable device. Connectors extend from one end of the housing to permit connections for power, to speakers for the audio function, to the GPS antenna, and other external devices.

Reference will now be made in detail to the present embodiments of the invention, examples of which are illustrated in the accompanying drawings. In the description that follows, similar or identical structure will be identified using identical callouts. Turning now to the drawings, FIG. 1 is a schematic representation of the communications apparatus, 10, of the present invention illustrating communications system, 12, having an antenna, 13, and an electronic serial number (ESN) which .resides in memory, 14; standard interface, 16; interchangeable devices, 18a-18c, also having electronic serial numbers (ESN) residing in memory chips, 20a-20c, respectively; and means for authentication, which includes an authentication agent residing on control processor, 22. It should be mentioned that at least one interchangeable device 18 and perhaps more than one device can be attached and operated using communications system 12, dependant upon how many interface positions 16 are made available on communications system 12.

Figure 2:
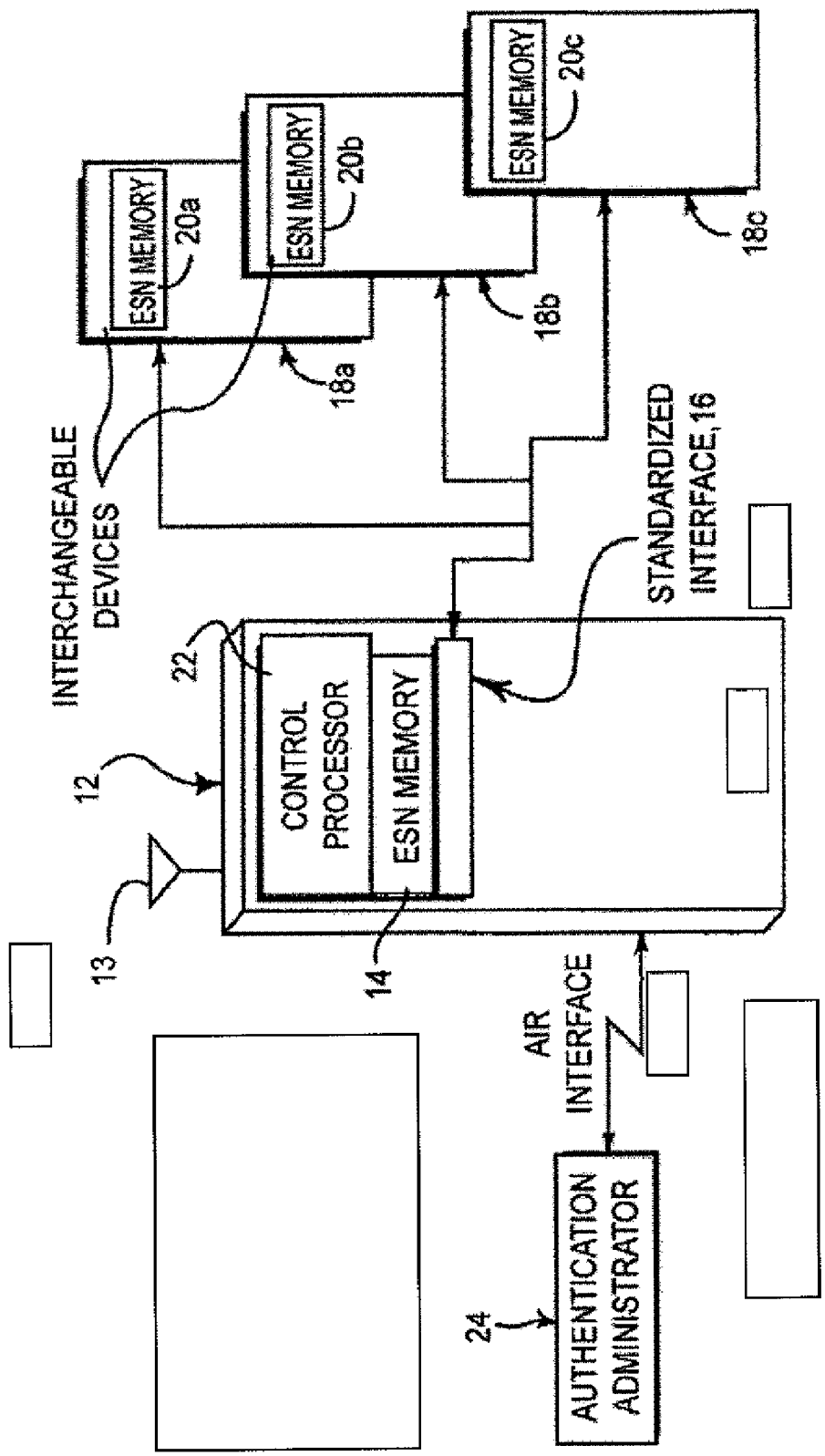
FIG. 2 is a schematic diagram illustrating an architecture for an authentication and activation system.

FIG. 2 is a schematic representation of architecture for the authentication and activation of communications system 12 and its interchangeable devices, 18, showing authentication administrator, 24, to which communication system 12 is in wireless communication. Both the communication system and interchangeable devices can be wirelessly authenticated and activated by a remote authentication administrator based on a unique electronic serial number on each device, thereby assisting in the prevention of fraud and identifying incompatibility of devices with the communications system.

Control processor 22 bears the authentication agent firmware, represents authentication administrator 24 bearing administrator software on communications system 12, and has three functions: (1) reading the. ESN located in the ESN memory from each connected device, and that for the communications system itself, and reporting these numbers to the authentication administrator; (2) monitoring correct behavior of each connected interchangeable device, and that for the communication system itself, and reporting anomalies to the authentication administrator; and (3) receiving authorization commands from the authentication administrator from which the functionality of the communications system and the interchangeable devices is either allowed or disabled as is specified by the authentication administrator. By "agent" it is meant software that runs on a client computer for use by administrative software running on a server. Agents are typically used to support administrative actions such as detecting system information or running.

The authentication administrator may reside on the network side of a wide area network, and the communications system may be a mobile communications system, as an example. In such a situation .the controller may wirelessly receive an ESN report from the authentication agent on the mobile communications system, and responds with an authorization command. Upon receiving the ESN report the authentication controller searches its data base to determine if each ESN is valid. The correct functionality on the mobile communications apparatus is then enabled, based on the following information, as examples: (a) the capabilities of the mobile communications system and the interchangeable devices; (b) any mobile communications system and interchangeable device software and hardware changes; (c) user selected preferences; (d) wide-area network capabilities; and (e) network application software capabilities.

Authentication is generally performed when the mobile communications apparatus configuration is changed. This may occur when an interchangeable device is added or removed or when an external apparatus connected to the interchangeable device is changed. The authentication agent may also report changes in the performance of any connected device. If, for example, an interchangeable device breaks and no longer responds to the authentication agent, the authentication agent would send a report to the authentication administrator, thereby permitting defective devices to be tracked and repaired.

The authentication controller may check ESNs and proper operation of all connected devices on a regular basis to determine if interchangeable devices are added or removed from the communications system, and to monitor correct operation of these devices. It reports the authentication controller only when the connection of a device or its performance changes. The authentication administrator may update the authentication agent at any time, either remotely or by direct contact.

Figure 3:
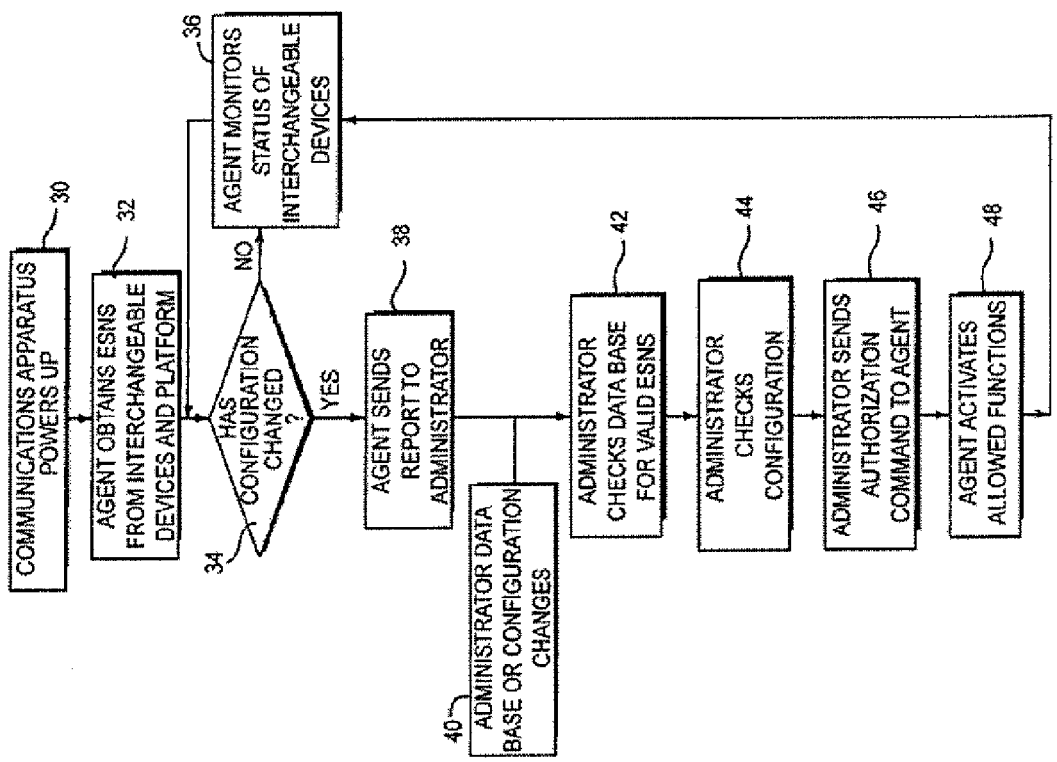
FIG. 3 is a process flow diagram showing an example of an authentication process.

FIG. 3 shows a flow chart of an example of an authentication process. After the communications system is powered on, 30, the authentication agent reads the electronic serial numbers from the devices attached to the communications system and that for the communications system itself, 32. A determination is then made by -the communications system as to whether the serial numbers have changed which would indicate a change in configuration of the communications apparatus, 34. If there is no change, the authentication agent simply monitors the status of the connected devices, 36. If a change has occurred, the authentication agent wirelessly transmits a report to the authentication administrator, 38, which checks its database, 40, for valid electronic serial numbers, 42. The authentication administrator then checks the configuration information from electronic serial numbers obtained, 44, and sends an authorization command to the authentication agent, 46, thereby directing the authentication agent to activate the allowed functions, 48. The authentication agent then continues to monitor the status of the connected devices while the communications system remains powered. Whenever the administrative data base or network configuration changes, the authentication administrator again checks the configuration information from the electronic serial numbers received, 44, and sends an authorization command to the authentication agent, 46 which permits the communications system to remain operational. If the electronic serial numbers are not found in the database, an inactivation command would be sent to the authentication agent, which would inactivate or depower the function of the device. It should be mentioned that the initial check of serial numbers might locate 'serial numbers which are not in the serial number database (invalid serial numbers), even if these numbers have not changed. In this situation as well, an inactivation command would be sent to the authentication agent, which would inactivate or depower the function of the device.

In summary, an example of a method for authenticating and activating, all elements of the system based on unique electronic serial numbers (ESNs) in each device being transmitted by an authentication agent on the communications system to a remote authentication administrator on the network has been described. Valid ESNs are activated by sending an activation code from the remote authentication controller to the authentication agent on the communications system, after which the authentication agent activates whatever functions are allowed by the authentication administrator or disables an invalid device.

Figure 4:
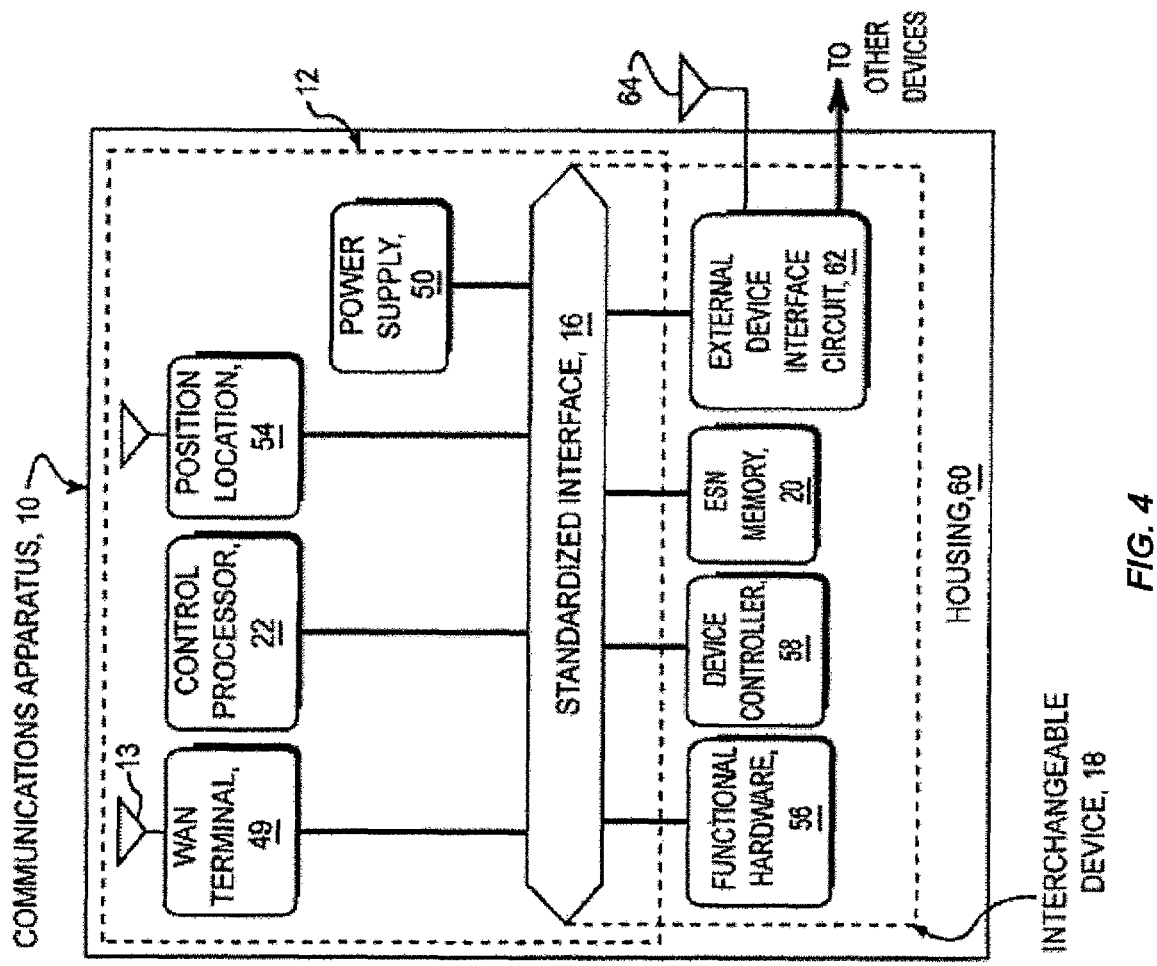
FIG. 4 is a schematic diagram illustrating a communications system and device interface card hardware.

FIG. 4 is a schematic representation of the hardware for communications apparatus 10 of the present invention which includes communications system 12, standardized interface, 16, and interchangeable device 18. Communications system 12 includes wireless wide area network (WAN) terminal, 49, for providing basic communications, standardized interface 16, power supply, 50, control processor, 22 which includes the communications system ESN in memory, and optional position location device, 54. Interchangeable device 18 includes a connector, not shown in FIG. 4, adapted to mate with standardized interface 16, ESN memory chip 20, and functional hardware, 56, which provides the functional capability of the device, such as a digital camera, as an example. Device controller, 58, enables interchangeable device 18 to communicate with communications system 12. The hardware may be enclosed within housing, 60. An optional external device interface circuit, 62, for attaching interchangeable device 18 to external devices may also be provided. It is anticipated that in some situations, the communication, between device 18 and external devices will occur wirelessly through antenna, 64. It should be mentioned that the communications system ESN can also be located in a separate memory outside of control processor 22.

Standardized interface 16 generates compatibility between different communications systems and interchangeable devices.

Wireless WAN terminal 49 may be a mobile communications device for permitting two-way voice and data communications with a wireless network over an air interface, such as a cellular phone, two way pager or digital cordless phone, as examples, or may be a stationary communications device. The WAN may be connected to the network by one or more of the following channels: voice channel, control channel, paging channel, circuit switched data, packet data or short message service (SMS).

Power supply 50 is a device for providing electrical power to communications apparatus 10 which includes any connected devices, and may be disposed externally, as in -the case of a vehicle battery, as an example, or internally to the .communications apparatus.

Housing 60 includes an enclosure which provides protection of the enclosed hardware from the elements, means for mounting the interchangeable devices, means for identifying the contents thereof including electronic serial numbers of the communications system and the interchangeable devices, and input/output means for providing communications with external devices.

Position location device 54 may be any device that determines the latitude and longitude of communications apparatus 10. A common type of location device is the GPS based on orbiting satellites. It should be mentioned that position location device 54 can be configured such that it is one of the interchangeable devices.

Each interchangeable device of the present invention may include a device controller 58 which renders the desired function of an interchangeable device compatible with communications system 12. In some embodiments of the invention, controller 58 may include additional communications bearers (wired or wireless), an application processor running application software, test and validation equipment, instrumentation, and controls.

Standardized interface 16 consists of a physical connection, electrical specifications and software protocol definitions. The physical connection includes the connector type and pin out, the board size and component clearance necessary for each interchangeable device to fit into standard enclosure 60. The electrical interface specifies the function and electrical characteristics of each signal on the interface connector. As will be described hereinbelow, a software interface specifies how multiple processors communicate across the interface and how authentication information is transferred.

As stated, control processor 22 of FIG. 4 bearing the authentication agent firmware is the representative of authentication administrator 24 on communications apparatus 10. It has six functions: (1) reading ESNs from each connected interchangeable device and that for the communications system itself, (2) reporting the ESN to the authentication administrator, (3) monitoring the correct behavior of each connected device and that for the communications system itself, (4) reporting anomalies to the authentication administrator; (5) receiving authorization commands from the authentication administrator; and (6) allowing or disabling functionality of the communications apparatus and interchangeable devices as specified by the authentication administrator.

The authentication agent monitors the status of all connected devices (see FIG. 3, hereof) by providing a sanity check from each device, using a well-known method generally termed "Watchdog," as an example. A watchdog timer provides a means of graceful recovery from a system problem. If the program fails to reset the watchdog at some predetermined interval, a hardware reset will be initiated. The "Watchdog" process finds significant use in industry. Each device controller 58 sends a periodic signal to a master device termed the watchdog controller or, in the present situation, the authentication agent firmware running on control processor 22. If the device ceases operating according to criteria set for this, the periodic signal stops and the watchdog controller detects an error. It then responds by resetting or removing power from that device and then restarting it. If the condition persists authentication agent may permanently disable the device or disable the entire system. A report of this condition would be sent to the authentication administrator.

There are other procedures suitable for authentication, many using a challenge and response approach, which all relies on encryption technology. The method of the present invention provides a simpler approach; that of requiring a central data base in the authentication administrator for keeping a record of the ESNs and the properties of the interchangeable devices.

Figure 5:
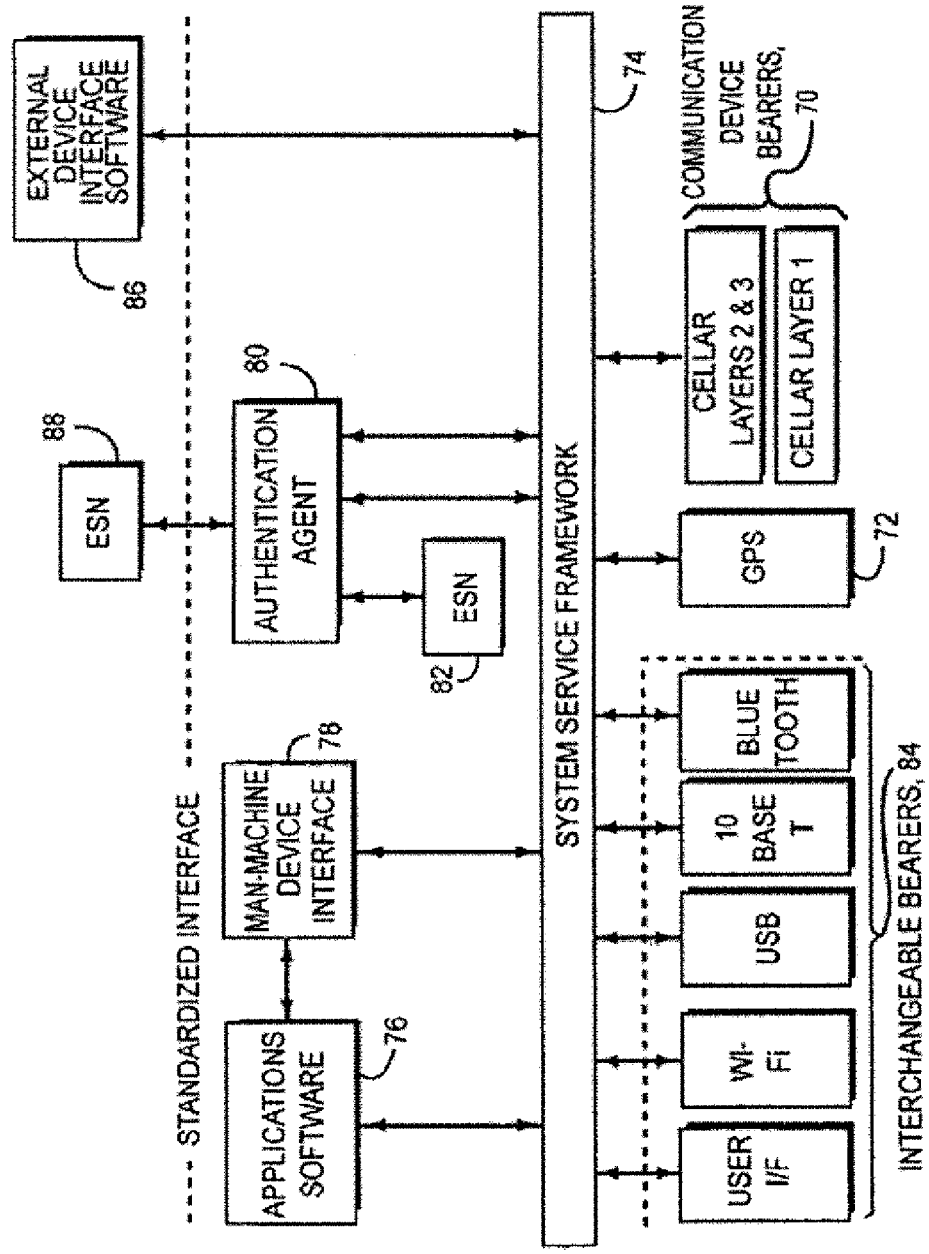
FIG. 5 is a schematic diagram illustrating communications system software and interchangeable device software.

FIG. 5 is a schematic representation of the communications system software and the interchangeable device software.

The software architecture may be a layered structure made up of a plurality of functional blocks. Each functional block is related to a hardware function or software process. The layering helps to make the software modular so that each function can operate independently. The principal blocks residing in communications system 12 include communications device bearers, 70 and 72, system services framework, 74, applications software, 76, man-machine interface, 78, authentication agent 80, and electronic serial number, 82. The blocks residing on interchangeable device 18 include interchangeable device bearers, 84, external device interface software, 86, and electronic serial numbers, 88. The term "bearer" in this context is defined as any communications facility from which subscriber services are derived. This definition includes any communications device.

Layers 1, 2 and 3, shown in FIG. 5 represent the lower 3 layers of the OSI 7498 standard. The seven layers of the OSI Basic Reference Model are: (1) the physical layer; (2) the data link layer; (3) the network layer; (4) the transport layer; (5) the session layer; (6) the presentation layer; and (7) the application layer.

Also, in FIG. 5, 10 Base T is the Local Area Network (LAN) standard connection, User I/F denotes user interface, and Wi-Fi (802.11), Bluetooth and USB bear their usual meanings.

The software blocks in FIG. 5 containing communications bearers are drawn below the system services framework. These are communications channels for specific protocols typically containing layers 1, 2, and 3 of the OSI basic reference model. Wide area network bearer 70 and optionally, position location bearer, 78, are part of the communications system because they are common to all applications. All other bearers reside on interchangeable devices 18.

System services framework 74 connects the software functional blocks. It promotes modularity of the functional blocks by providing standardized messaging between them. This provides the upper layers with a higher level of abstraction so that they are unaffected by the choice of bearer being used in any particular application at any given time.

The blocks in FIG. 5 drawn above the system services framework includes man-machine interface 78, applications software, 76, authentication agent, 80, and electronic serial number (ESN), 82, on the communications apparatus. It also contains one or more external device interfaces, 86, and interchangeable device ESNs, 88 which reside on the interchangeable devices. The ESNs are read by the authentication agent, which transfers them to the authentication administrator through the system services framework and the cellular bearer channel.

Figure 6:
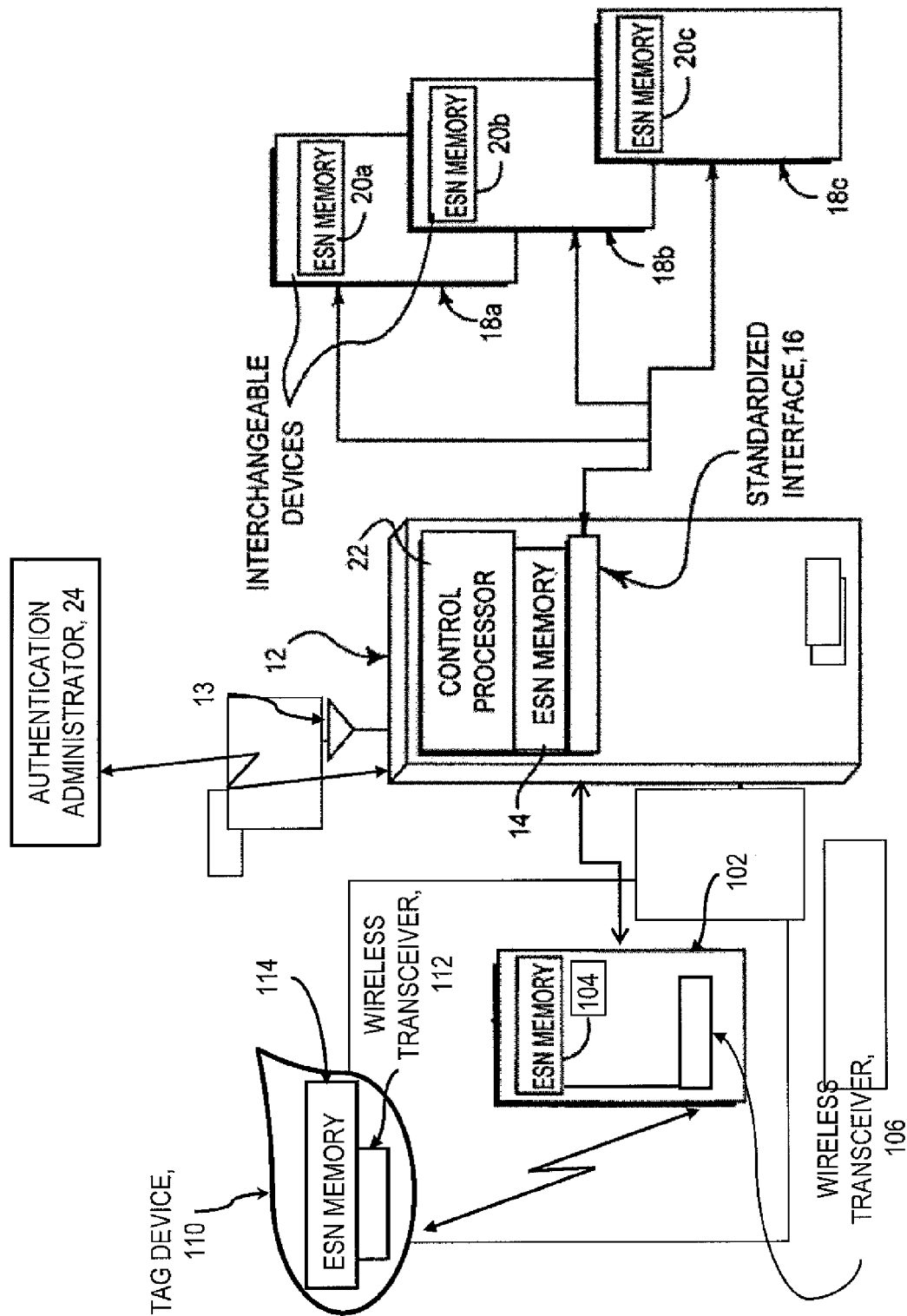
FIG. 6 is a schematic diagram illustrating an architecture for an authentication and activation system.
Figure 7:
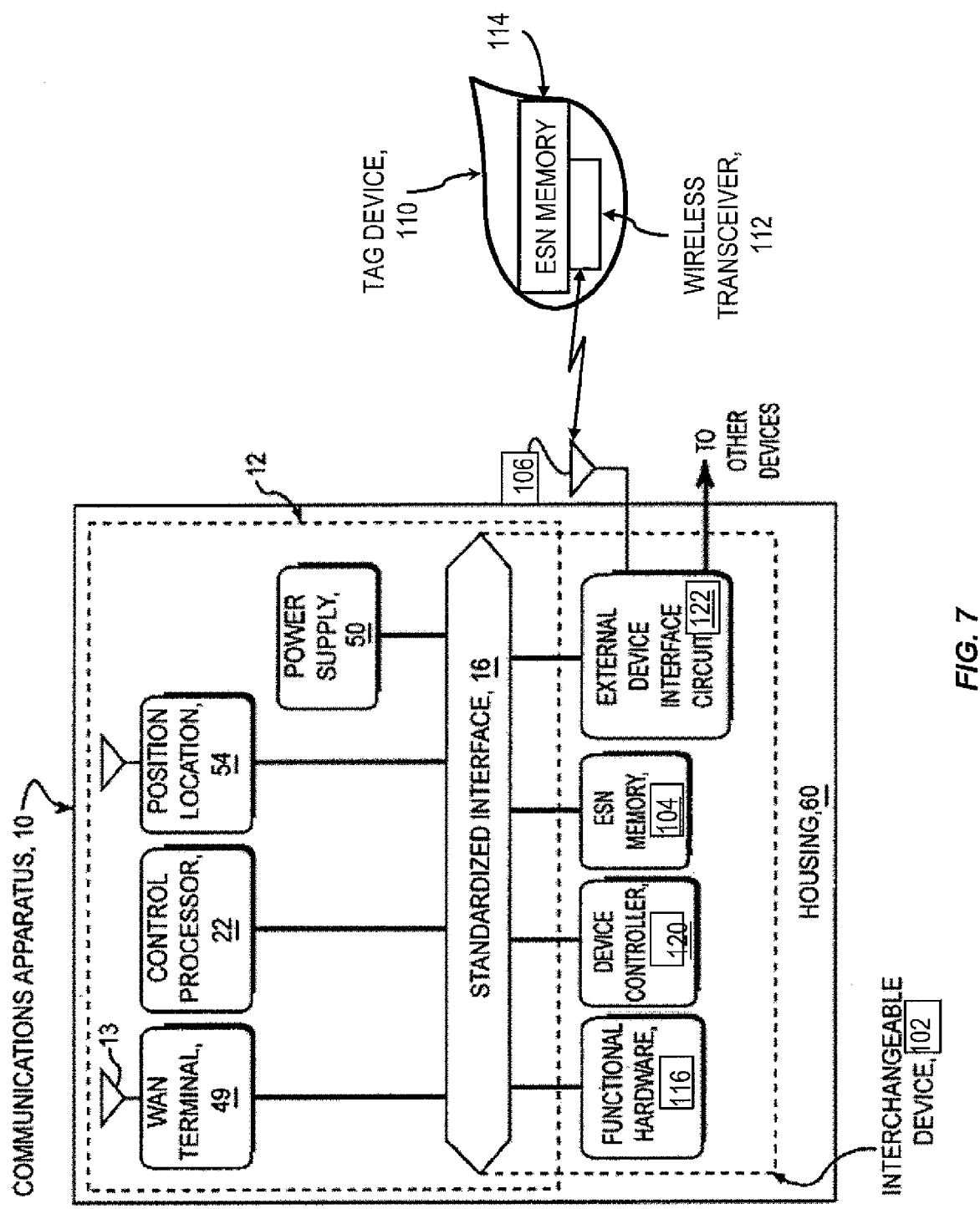
FIG. 7 is a schematic diagram illustrating a communications system and device interface card hardware.

Further implementations of the current subject matter, which are discussed above but described in greater detail below, are illustrated in FIG. 6 and FIG. 7. A wireless interchangeable device 102 can be connected to the standardized electronic interface 16 of the communication system 12. Alternatively, the wireless interchangeable device 102 can be physically connected via an electronic interface or other comparable means to interchangeable device 18 that is in turn physically connected to the standardized interface 16 of the communication system 12. Optionally, one or more additional interchangeable devices 18a, 18b, 18c as shown in FIG. 2 can also be connected to the standardized interface. The wireless interchangeable device 102 can include an electronic serial number memory 104, as well as a short range antenna or wireless transceiver 106. These features are all similar to those shown in FIG. 1 and FIG. 2 for the interchangeable devices 18. Also part of the system shown in FIG. 6 is a "tag" device 110 that includes a tag wireless transceiver 112 or other means for transmitting authentication information and a tag electronic serial number memory 114. In this implementation, the tag ESN memory 114 includes a tag electronic serial number that is transmitted by the tag wireless transceiver 112. The electronic serial number memory 104 within the wireless interchangeable device 102 retains one or more electronic serial numbers that are wirelessly transmitted to the wireless interchangeable device 102 by one or more associated tag devices 110. The wireless interchangeable device electronic serial number memory 104 can also optionally include a wireless device electronic serial number that is also passed to the control processor 22 and on to the authentication administrator 24 via the antenna 13.

The tag device 110 and the wireless interchangeable device 102 can in some implementations be coupled passive, active, or semi-passive Radio Frequency Identification (RFID) devices. Other technologies, such as for example bar code reading, infrared transmission of authentication codes, Bluetooth authentication, one or more WiFi (such as for example 802.11a, b, g, n, etc.) protocols, Zigbee, or the like that exchange authentication information over a relatively short range (for example tens of centimeters, one or more meters or less, or perhaps as much as a few hundred meters to a kilometer) can also be used.

RFID devices can include an integrated circuit for storing and processing information, modulating and demodulating a (RF) signal, and, optionally, other specialized functions. Passive devices operate by current induction in an internal antenna caused by incoming radio frequency signals. This induced current causes an integrated circuit to power up and transmit an authentication code and/or additional information. Back scatter of the incoming radio signal can be used to transmit the necessary information. Active devices typically include an internal power source that powers the integrated circuit or circuits and broadcasts the signal. Semi-passive RFID devices include a power source to operate the integrated circuit, but use back scatter of incoming radio signals much like a passive device would. All such types of RFID devices are within the scope of the currently disclosed subject matter, as are other devices that are capable of transmitting an authentication code and optionally additional information to a receiver device.

Also shown in FIG. 6 is the authentication administrator, 24, with which communication system 12 is in wireless communication. Both the communication system 12, the interchangeable devices 18a, 18b, 18c, 102, and one or more tag devices 110 whose tag electronic serial numbers have been transmitted to the wireless interchangeable device ESN memory 104 can be wirelessly authenticated and activated by the remote authentication administrator 24 based on the unique electronic serial number of each device, thereby assisting in the prevention of fraud and identifying incompatibility of devices with the communications system. In the implementation shown in FIG. 6, the wireless interchangeable device 102 passes the tag ESN which is received wirelessly at the wireless transceiver 106 to the authentication administrator via the communication system 12. The tag ESN can be stored in the wireless interchangeable device ESN memory 104 and then passed to the control processor 22 via the standardized interface 16 to which the wireless interchangeable device 102 can be physically connected. As noted above, the wireless interchangeable device 102 can also alternatively be an add-on device that physically and electronically connects to one of the interchangeable devices 18a, 18b, 18c and communicates with the control processor 22 via the physical connection of the interchangeable device 18a, 18b, 18c with the standardized interface 16.

As described above, the control processor 22 includes the authentication agent firmware. The authentication agent, when executed on the control processor 22, represents the authentication administrator 24 and runs administrator software that causes the control processor to perform at least three functions: (1) reading the electronic serial number(s) located in the communication system ESN memory 14 and the ESN memory 20, 104, 114 of each connected interchangeable device 18, 102, and/or one or more tag devices 110 and reporting these numbers to the authentication administrator 24; (2) monitoring correct behavior of each connected interchangeable device 18, 102, of each tag device 110 (if present), and of the communication system 12 itself, and reporting anomalies to the authentication administrator 24; and (3) receiving authorization commands from the authentication administrator 24 from which the functionality of the communications system 12, the interchangeable devices 18, 102 and/or one or more tag devices 110 (if present) is either allowed or disabled as specified by the authentication administrator 24. For purposes of this description, "agent" refers to software that runs on a client computer, such as the control processor 22, for use by administrative software running on a server. Agents can also be used to support administrative actions such as detecting system information or running.

The authentication administrator 24 may reside on the network side of a wide area network, and the communications system 12 can be a mobile communications system, as an example. In such a situation, the authentication administrator 24 can wirelessly receive an ESN report over a wireless wide are network (such as for example a cellular network including but not limited to networks that communicate via CDMA, GSM, 3G, analog radio communication links, other digital links, and the like) from the authentication agent on the mobile communications system 12, and respond with an authorization command. Upon receiving the ESN report the authentication administrator 24 searches a data base to determine if each ESN is valid. The correct functionality on the mobile communications system 12 can then enabled, based on the information that can include but is not limited to: the capabilities of the mobile communications system 12, the interchangeable devices 18, 102 and/or any tag devices 110 that are present; any mobile communications system, interchangeable device 18, 102, and/or tag device 110 software and hardware changes, user selected preferences, wide-area network capabilities, and network application software capabilities.

Authentication can be performed when the configuration of the mobile communications system 12 is changed. This may occur when an interchangeable device 18, 102 is added or removed, when one or more tag devices 110 are detected or removed from communication range with the short range antenna or wireless transceiver 106, and/or when an external apparatus connected to the interchangeable device is changed. The authentication agent may also report changes in the performance of any connected interchangeable device 18, 102, of the communication system 12 itself, and/or of any tag devices in communication with the system via the short range antenna or wireless transceiver 106. If, for example, an interchangeable device 18, 102 or a tag device breaks, goes out of range, or otherwise no longer responds to the authentication agent, the authentication agent could send a report to the authentication administrator 24, thereby permitting defective devices to be tracked and repaired.

As described above, the control processor 22 can optionally check ESNs and proper operation of all connected devices, including one or more of the interchangeable devices 18, the wireless interchangeable device 102, and/or one or more tag devices 110 in communication with the short range antenna or wireless transceiver 106 on a regular basis to determine if interchangeable devices 18, 102 and/or tag devices 110 are added or removed from the communications system 12, and to monitor correct operation of these devices. The control processor 22 can optionally report to the authentication administrator 24 when the connection of a device or its performance changes, when the communication system 12 is powered up or down, when a tag device 110 is detected or communication with a previously detected tag device 110 is lost or under one or more other pre-determined conditions. The authentication administrator 24 can update the authentication agent on the control processor 22 at any time, either remotely or by direct electronic contact.

FIG. 7 is a schematic representation of the hardware for communications apparatus 10 which is similar to the apparatus shown in FIG. 4 as described above. As a further example of the operation of an implementation of the current subject matter, the communications system 12 has a standardized interface 16 which can optionally also have one or more interchangeable devices 18 or wireless interchangeable devices 102 attached thereto. Communications system 12 can include a wireless wide area network (WAN) terminal, 49, for providing basic communications with the authentication administrator (not shown in FIG. 7), a standardized interface 16, a power supply 50, a control processor 22 which can include the communications system ESN in its memory, and an optional position location device 54. The communications system ESN can also be located in a separate memory outside of control processor 22.

A wireless interchangeable device 102 can include a connector that is adapted to mate with the standardized interface 16, a wireless interchangeable device ESN memory chip 104, and optionally one or more functional hardware components 116 which provide one or more functional capabilities of the wireless interchangeable device 102, such as for example a digital camera, an RFID transceiver for communicating with one or more tag devices 110, or the like. A wireless interchangeable device controller 120, can be included to enable the wireless interchangeable device 102 to communicate with communications system 12 and/or to control one or more functions of the wireless interchangeable device 102. The hardware may be enclosed within housing, 60. An optional external device interface circuit 122, for attaching the wireless interchangeable device 102 to external devices can also be provided. Communication between the wireless interchangeable device 102 and one or more external devices, such as for example one or more tag devices 110 can occur wirelessly through a short range antenna or wireless transceiver 106. Alternatively, an external device can be attached via a wired or other physical connection. Other features of FIG. 7 can operate as discussed above in regards to FIG. 4.

There are other procedures suitable for authentication, many using a challenge and response approach, which all relies on encryption technology. The method of the present invention provides a simpler approach; that of requiring a central data base in the authentication administrator for keeping a record of the ESNs and the properties of the interchangeable devices.

The systems and/or methods disclosed herein can be employed in an electronic "key" system that can have a variety of applications. One example of such an application could be in a system for protecting an automobile against unauthorized use or to identify the driver of the vehicle. In this example, the communication system 12 could be mounted in the automobile in an unobtrusive, hidden, and/or not readily accessible location. The tag device 110 could be carried by an authorized user of the automobile. When the tag interchangeable device 110 is brought within a sufficiently close proximity to the communication system 12, the tag device wireless transceiver 112 communicates with the wireless interchangeable device transceiver or antenna 106 to pass the tag device electronic serial number to the wireless interchangeable device ESN memory 104 and on to the control processor 22 where the authentication agent performs steps as discussed above to verify the tag device electronic serial number and the communication device electronic serial number with the authentication administrator 24. The authentication administrator 24 can also optionally verify the electronic serial numbers of the wireless interchangeable device 102 and/or of the communication system 12 which can be stored on the respective ESN memories 104, 14. If verification is not received, the authentication agent could activate one or more features of the communication system, such as for example an additional installed interchangeable device that functions as an ignition system interlock to disable the vehicle from operating.

Alternatively or in addition, the authentication administrator 24 can verify the identity of a user associated with the tag device 110 that has been brought into sufficient proximity with the communication system 12 to pass the tag device ESN to the wireless interchangeable device ESN memory 104. Based on the identity of the user associated with the tag device 110, the authentication administrator can activate geo-boundary software that runs on either or both of the authentication administrator 24 and the control processor 22. An additional interchangeable device 18 can include a location identification device, such as for example a GPS transceiver. Data from the location identification device can be read by the control processor 22 and compared to one or more conditions specified by the authentication administrator 24. The control processor software or authentication agent can be set to perform one or more actions upon detecting that the location data indicates that the vehicle has crossed a boundary that is specified by the authentication administrator based on the identity of the user associated with the tag device. Such actions can optionally include sending an alert to a predetermined recipient (such as for example an owner of the vehicle) in the form or a text message, an e-mail, a phone message, or the like. The one or more actions could also optionally include activating an in-vehicle visual or audio alert to notify the vehicle operator of the disallowed crossing of the geo-boundary and/or activating a time limit to vehicle shut-down. By maintaining the authentication and authorization functions at the authentication administrator 24, authorization control can be changed if circumstances, such as for example the theft of an otherwise authorized tag device 110, requires deactivation of the ability of the tag device 110 activate the vehicle.

As a general note, throughout this disclosure, whenever reference is made to "the present invention," it should be understood to mean "the disclosed subject matter" in that more than one patentable invention may be disclosed and/or referred to. The subject matter described herein may be embodied in systems, apparatus, methods, and/or articles depending on the desired configuration. In particular, various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor. A machine-readable medium can receive machine instructions as a machine-readable signal. The term "machine-readable signal" refers to any signal used to provide machine instructions and/or data to a programmable processor.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not require the particular order shown, or sequential order, to achieve desirable results. Other embodiments may be within the scope of the following claims.

What is claimed is:

1. A system, comprising:
    a standardized electronic interface;
    a wireless interchangeable device that is physically interfaced to the standardized interface, the wireless interchangeable device comprising a short range wireless transceiver and a first electronic serial number memory, the short range wireless transceiver providing a wireless communication link via which the first electronic serial number memory receives a tag device electronic serial number from a tag device;
    a communications system that is physically interfaced to the standardized electronic interface, the communications system comprising a communication system memory bearing a second electronic serial number, a wireless wide area network terminal, and a control processor executing an authentication agent, the authentication agent transmitting, via the wireless wide area network terminal, a report comprising the tag electronic serial number and the second electronic serial number to an authentication administrator and receiving, via the wireless wide area network terminal, an authorization command that directs the authentication agent to either enable one or more authorized functions of the system if the tag and the second electronic serial numbers are verified by the authentication administrator or disable the one or more functions of the system if the tag and the second electronic serial numbers are not verified by the authentication administrator.

2. A system as in claim 1, further comprising the tag device which comprises a tag memory bearing the tag electronic serial number and a transceiver that transmits the authentication signal.

3. A system as in claim 1, wherein, upon receiving the tag electronic serial number, the authentication agent reads the second electronic serial number from the communication system memory and transmits the report if either the tag electronic serial number or the second electronic serial numbers differ from their previous values.

4. A system as in claim 1, further comprising an additional interchangeable device that is physically interfaced to the standardized electronic interface, the additional interchangeable device comprising a position location device, an additional memory storing a third electronic serial number, and an additional connector adapted to mate with the standardized electronic interface, the report further comprising the third electronic serial number.

5. A system as in claim 1, further comprising an additional interchangeable device that comprises an additional memory storing a third electronic serial number, a first additional connector adapted to mate with the standardized electronic interface, and a second additional connector to mate with the wireless interchangeable device; the report further comprising the third electronic serial number; and the wireless interchangeable device physically interfacing to the standardized interface by mating with the second additional connector on the additional interchangeable device while the first additional connector mates with the standardized electronic interface.

6. A system as in claim 5, wherein the interchangeable device further comprises functional hardware for performing at least one chosen function selected from the group consisting of digital photography, car diagnostics, position location, equipment testing, hand-free communications, microcomputer capability, and display.

7. A system as in claim 1, wherein the authentication administrator comprises a database of valid electronic serial numbers against which the first and the second electronic serial numbers are verified.

8. A system as in claim 1, wherein the wireless wide area network terminal is selected from a group consisting of cellular telephones and two-way pagers.

9. A system as in claim 1, wherein the communications system further comprises a power supply.

10. A system as in claim 1, wherein the communications system further comprises a position locator.

11. A system as in claim 1, wherein the communication system comprises a cellular telephone that comprises a removable battery, and wherein one of the wireless interchangeable device and an additional interchangeable device replaces the removable battery.

12. A method comprising:
receiving, at an authentication administrator via a wireless wide area network connection, a report from an authentication agent on a communication system, the report comprising a first electronic serial number corresponding to the communication system and a second electronic serial number corresponding to a tag device that communicates wirelessly with a wireless interchangeable device that is physically interfaced to the communication system;
comparing the first and the second electronic serial numbers with a database of electronic serial numbers; and
transmitting, to the communication system via the wireless wide area network, an authorization command that directs the authorization agent to a) enable one or more functions of the communication system if the first and the second electronic serial numbers are verified by the authentication administrator or b) disable one or more functions of the communication system if the first and the second electronic serial numbers are not located in the database.

13. A method as in claim 12, wherein the one or more functions of the communication system are provided by an additional interchangeable device that is physically interfaced to the communication system.

14. A method as in claim 12, wherein the report further comprises location data regarding the communication system and wherein the administration administrator further compares the location data to an allowable geographic area corresponding to the second electronic serial number and generates an alert to a designated recipient if the location data indicate that the communication device is not within the allowable geographic area.

15. A method as in claim 13, wherein communication system is installed in a vehicle, the one or more functions of the communication system comprising an ignition interlock that is activated if the location data indicate that the communication device is not within the allowable geographic area.

16. A method comprising:
transmitting a report from an authentication agent executed on a communication system to an authentication administrator via a wireless wide area network terminal on the communication system, the report comprising a first electronic serial number read by the authentication agent from a first memory on the communication system and a second electronic serial number that is received at a wireless interchangeable device via a wireless link from a tag device, the wireless interchangeable device being physically interfaced to the communication system via a standardized interface on the communication system;
receiving, via the wireless wide area network terminal, an authorization command that directs the authorization agent to a) enable one or more functions of the communication system if the first and the second electronic serial numbers are verified by the authentication administrator or b) disable one or more functions of the communication system if the first and the second electronic serial numbers are not verified by the authentication server.

17. A method as in claim 16, wherein the one or more functions of the communication system are provided by an additional interchangeable device that is physically interfaced to the communication system.

18. A method as in claim 15, wherein the authentication administrator comprises a database of valid electronic serial numbers against which the first and the second electronic serial numbers are verified.

19. A method as in claim 16, wherein, upon receiving the second electronic serial number in the wireless authentication signal, the authentication agent reads the first electronic serial number from the first memory and transmits the report if either the first electronic serial number or the second electronic serial numbers differ from their previous values.

20. A method as in claim 16, wherein the report further comprises location data regarding the communication system.

* * * * *